(12) United States Patent
Koch et al.

(10) Patent No.: US 6,748,126 B2
(45) Date of Patent: Jun. 8, 2004

(54) SYSTEM FOR POLARIZATION MODE DISPERSION COMPENSATION

(75) Inventors: Barry J. Koch, Blaine, MN (US); Terry L. Smith, Roseville, MN (US); Barbara A. DeBaun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 260 days.

(21) Appl. No.: 10/036,987

(22) Filed: Dec. 31, 2001

(65) Prior Publication Data

US 2003/0123776 A1 Jul. 3, 2003

(51) Int. Cl.$^7$ .................................................. G02B 6/00
(52) U.S. Cl. ............................ 385/11; 385/37; 385/27
(58) Field of Search ............................ 385/4, 9, 10, 11, 385/24, 27, 37, 39, 42; 398/29, 65, 81, 136

(56) References Cited

U.S. PATENT DOCUMENTS

| | | | |
|---|---|---|---|
| 5,048,909 A | 9/1991 | Henry et al. | |
| 5,093,876 A | 3/1992 | Henry et al. | |
| 5,600,738 A | 2/1997 | Berglund et al. | |
| RE35,516 E | 5/1997 | Henry et al. | |
| 5,708,734 A | 1/1998 | Van Der Tol | |
| 5,790,721 A | 8/1998 | Lee | |
| 5,828,681 A | 10/1998 | Epworth | |
| 5,844,926 A | 12/1998 | Byron et al. | |
| 5,859,939 A | 1/1999 | Fee et al. | |
| 5,905,823 A | 5/1999 | Shintaku et al. | |
| 5,930,414 A | * 7/1999 | Fishman et al. | 385/11 |
| 5,974,206 A | 10/1999 | Bricheno et al. | |
| 5,982,963 A | 11/1999 | Feng et al. | |
| 6,137,604 A | 10/2000 | Bergano | |
| 6,148,127 A | 11/2000 | Adams et al. | |
| 6,271,952 B1 | * 8/2001 | Epworth | 398/147 |

FOREIGN PATENT DOCUMENTS

| | | |
|---|---|---|
| DE | 199 03 523 A1 | 8/2000 |
| EP | 0 964 237 A1 | 12/1999 |
| EP | 0 982 882 A2 | 3/2000 |
| JP | 07231291 | 8/1995 |
| WO | WO 01/27667 A2 | 4/2001 |

OTHER PUBLICATIONS

D. Sobiski, et al., "Fast First–Order PMD Compensation with Low Insertion Loss for 10Gbit/s System", Electronics Letters, 4$^{th}$ Jan. 2001, vol. 37, No. 1, pp. 46–48.

H. Rosenfeldt, et al., "PMD Compensation in 10Gbit/s NRZ Field Experiment Using Polarimetric Error Signal", Electronics Letters, 2$^{nd}$ Mar. 2000, vol. 36, No. 5, pp. 448–450.

(List continued on next page.)

Primary Examiner—Edward J. Glick
Assistant Examiner—Therese Barber
(74) Attorney, Agent, or Firm—Gregg H. Rosenblatt

(57) ABSTRACT

An adaptive polarization mode dispersion compensator including a polarization controller and a differential polarization delay unit. The polarization controller converts incoming light of an arbitrary polarization to a controller output signal having a desired state of polarization. The differential polarization delay unit is optically coupled to receive the controller output signal from the polarization controller. The differential polarization delay unit includes a polarization beam splitter element and a first and a second birefringent optical waveguide.

At least one tuning mechanism is coupled to at least one of the gratings, wherein the tuning mechanism variably adjusts one of the reference reflection points with respect to the other reference reflection point. A combiner element recombines the two reflected orthogonal polarization signals into a delay line output. A signal quality analyzer evaluates the quality of the differential polarization delay unit output signal and provides a control signal to the polarization controller and the differential polarization delay unit.

30 Claims, 9 Drawing Sheets

OTHER PUBLICATIONS

Reinhold Noé, et al., "*Polarization Mode Dispersion Compensation at 10, 20, and 40 Gb/s with Various Optical Equalizers*", Journal of LIghtwave Technology, vol. 17, No. 9, Sep. 1999, pp. 1602–1616.

D. A. Watley, et al., "*Compensation of Polarisation–Mode Dispersion Exceeding One Bit Period Using Single High–Birefringence Fibre*", Electronics Letters, 24$^{th}$ Jun. 1999, vol. 35, No. 13, pp. 1094–1095.

Takeshi Ozeki, et al., "*Polarization–Mode–Dispersion Equalization Experiment Using a Variable Equalizing Optical Circuit Controlled by a Pulse–Waveform–Comparison Algorithm*", OFC '94 Technical Digest, Tuesday Afternoon, pp. 62–64.

T. Takahashi, et al., "*Automatic Compensation Technique for Timewise Fluctuating Polarisation Mode Dispersion in In–Line Amplifier Systems*", Electronics Letters, 17$^{th}$ Feb. 1994, vol. 30, No. 4, pp. 348–349.

\* cited by examiner

SYSTEM FOR POLARIZATION MODE DISPERSION COMPENSATION

RELATED APPLICATIONS

The present application is related to the co-pending, commonly assigned application entitled, "Method for All Order Dispersion Compensation", Ser. No. 10/037,024 filed co-currently with the present application, which is hereby incorporated by reference.

BACKGROUND OF THE INVENTION

The present invention relates to a method and system for polarization mode dispersion compensation of optical signals. In particular, the present invention relates to a method for polarization mode dispersion compensation using at least two linearly chirped Bragg gratings to selectively tune the reflection points of two polarization resolved signals, creating a variable polarization dependent delay.

Present day telecommunication systems require that optical signals be conveyed over very long distances. In an optical communications signal, data are sent in a series of optical pulses. Real signal pulses are composed of a distribution of wavelengths and polarizations, each of which travels at its own characteristic velocity. This variation in velocity leads to pulse spreading and thus signal degradation. Degradation due to the wavelength dependence of the velocity is known as chromatic dispersion, while degradation due to the polarization dependence is known as polarization mode dispersion.

Mathematically, the speed of light v in a waveguide is given by $$v = \frac{c}{n} \quad (1)$$

where c is the velocity of light in free space and n is the effective index of refraction in the waveguide. Normally, the effective index, n, of the optical mode is dependent upon the wavelength. Thus components of light having different wavelengths will travel at different speeds. In addition to being dependent upon wavelength, the effective index in a waveguide may also be dependent upon the polarization of the optical signal. Even in "single-mode" fiber, two orthogonal polarizations are supported, and, in the presence of birefringence, the polarizations travel at different speeds. Birefringence in the fiber may arise from a variety of sources including both manufacturing variations and time-dependent environmental factors. The speed difference results in a polarization-dependent travel time or "differential group delay" (DGD) between the 2 different polarization modes within the birefringent fiber. In real systems, the degree of birefringence, and the orientation of the birefringent axes, varies from place to place along the fiber. This results in a more complex effect on the optical signal, which is characterized by the concept of "principal states of polarization" or PSPs. PSPs are defined as the two polarization states that experience the maximum relative DGD, and they uniquely characterize the instantaneous state of the system Polarization mode dispersion (PMD) is the distortion arising from the statistical sum of the different group velocities of the two components of polarization as the signal propagates through the different sections of the optical communications system. PMD includes first order PMD and higher order PMD and is non-deterministic. First order PMD is the differential polarization group delay at a given wavelength. The instantaneous value for a long fiber can vary over both long time intervals (due to slow variations, such as temperature drift) and short time intervals (due to fast variations, such as mechanical vibration induced polarization fluctuations). The coefficient describing the mean value of first order PMD can vary from >2 ps/km$^{1/2}$ for relatively poor PMD performance fiber to <0.1 ps/km$^{1/2}$ for relatively good PMD performance fiber.

Second order PMD arises from two sources: i.) a first order PMD that varies with wavelength; ii.) a change of the system PSP (principal state of polarization) orientation with wavelength, which results in a variation of PMD with wavelength. Second order PMD results in a wavelength dependent group delay, which is equivalent in effect to variable chromatic dispersion, and, can have either a negative or positive sign. The speed of fluctuation is similar to that of first order PMD.

Dispersion imposes serious limitations on transmission bandwidth, especially across long distances, such as in transoceanic routes. Dispersion issues become much more important at higher bit rates, where the separation between the optical pulses is less and where shorter pulses result in a wider signal spectral bandwidth, exacerbating chromatic and second order PMD effects. At bit rates greater than or equal to 40 Gb/s, even for good fiber (<0.1 ps/km$^{1/2}$ PMD) long length links are deemed to require PMD compensation. PMD can become an inhibiting factor either limiting overall system length or increasing system costs due to the need for additional optical-to-electrical-to-optical signal conversion sites to permit electrical signal regeneration.

One approach to compensation for first order PMD is to introduce a DGD of equal magnitude and opposite sign to the first order PMD in the system. In general, time delays in an optical system can be described in terms of optical path length (OPL) defined by $$\Delta = nL \quad (2)$$

where $\Delta$ is the OPL, L is the physical length of the medium, and n is the index of refraction of the material.

As may be appreciated from equation (2) above, the OPL of an optical waveguide may be lengthened by increasing the index of refraction of the medium or by increasing the physical length of the waveguide. Similarly, the OPL of an optical waveguide may be shortened by decreasing the index of refraction or by decreasing the physical length of the waveguide. Thus, to generate a DGD for PMD compensation, the two orthogonal PSPs of the signal can be sent down two separate paths with different OPLs. If the delayed polarization of the signal is sent down a path with a shorter path length than the leading polarization of the signal, the amount of differential group delay between the two polarizations will be reduced.

A variety of alternatives have been presented to attempt to compensate for first order PMD effects. One proposed system includes a polarization controller and a length of high birefringence polarization maintaining (PM) fiber. A photodetector samples the output signal and attempts to drive the controller using control loop techniques. A long coil of PM fiber (e.g., 50 meters) is necessary to achieve adequately large DGD for dispersion compensation. More importantly, the amount of PMD correction is fixed because of the fixed DGD of the PM fiber, limiting the adaptability and applicability of the system.

Another proposed system attempts to address the problem of adaptability by employing a movable prism element, which generates a variable DGD by varying the distance traveled by one polarization. There are a number of disadvantages to this scheme. For example, optical path losses must be very closely balanced to prevent polarization-dependent loss (PDL). In addition, the overall speed of the variable delay element will be slow due to the mechanical movement of the optics. Furthermore, since the variable delay is created outside of fiber there may be issues of cost and stability due to the complexity associated with the required active alignment of the optical beam.

Another proposed approach to a variable DGD element consists of a single non-linearly chirped grating in a PM fiber. Chirped gratings are gratings in which the spacing of the grating elements varies with position along the grating, so that the effective position at which a signal is reflected depends on its wavelength. In this case, the application of axial strain to the fiber changes the reflection location of each polarization at a different rate, thus changing the delay between them. However, such a design can only achieve a limited range of delays because the differential delay is proportional to the small birefringence of the fiber, and is limited by the small range of strain that the fiber can withstand before breaking. Additionally, this approach induces a varying chromatic dispersion that must be separately compensated Yet another proposed approach to generating a differential group delay (DGD) consists of a polarization beam splitter coupled to a pair of single-mode (SM) optical fibers each having a linearly chirped Bragg reflection grating and a controllable extension means for differentially axially straining the fibers. This dual grating approach has the advantage that the two polarization components experience the same chirp when reflected, thereby experiencing matched chromatic dispersion so that polarization-dependent chromatic dispersion is not introduced. However, such a system does not account for polarization fading effects which will require dynamic polarization control in each of the SM fiber grating paths to assure that all light returns properly through the polarization splitter; this will substantially add to the complexity and cost of the system. Furthermore, such a system does not address the difficulty of balancing the two legs during manufacturing, or of properly biasing the system when the compensator is first turned on.

The need remains for a reliable, wide-dynamic range, dynamically tunable PMD system.

SUMMARY OF THE INVENTION

The present invention relates to a dynamically tunable polarization dispersion compensator including a polarization controller and a variable differential polarization delay unit. The polarization controller converts incoming light of an arbitrary polarization to a controlled output signal having a desired state of polarization. The differential polarization delay unit is optically coupled to receive the controller output signal. The differential polarization delay unit includes a polarization beam splitter element, a differential delay element, and a polarization combiner element. The polarization beam splitter has a first input port coupled to receive the controller output signal, a split point, and a first and a second output port, where at the split point the controller output signal is split into a first and a second orthogonal polarization signals. The first and the second polarization signals are directed to the first and second output ports of the splitter respectively. The differential delay element includes a first waveguide and a second waveguide. The waveguides are birefringent, thereby suppressing coupling between the two polarization modes in each. The first waveguide and the first output port of the splitter are optically coupled and aligned by matching their cores and polarization axes. The first waveguide has a first chirped grating tuned to reflect the first polarization signal at a first reference reflection point. The second waveguide is optically coupled and aligned to the second output port of the splitter. The second waveguide has a second chirped grating tuned to reflect the second polarization signal and has a second reference reflection point. The chirp of the gratings may be linear, or may have a more complex spatial dependence.

At least one tuning mechanism is coupled to at least one of the gratings. The tuning mechanism is capable of variably adjusting the optical path length of one or both of the reference points, with respect to the split point. The tuning mechanism may include: applying axial mechanical stress to stretch the gratings, applying electric fields to electro-optically control the grating index, applying heat to thermo-optically control the grating index, or using other tuning mechanisms known in the art. In one embodiment, the tuning mechanism includes a first tuning device and a second tuning device. The first tuning device is coupled to both the first and second gratings and tunes both gratings generally simultaneously and in equal amounts. The second tuning device independently tunes only one of the gratings.

The initial position of the first and second reference reflection points with respect to the split point (i.e., the optical path length of the segment) may be tailored to the particular application. In applications where the expected DGD does not exceed the range of the tuning mechanism, the first and second reference reflection points may be at substantially the same optical path length with respect to the split point. Alternatively, one or the other reference reflection points may be biased, that is, have a different optical path length, to compensate for all or part of the PMD. A combiner element recombines the two reflected orthogonal polarization signals into a delay line output. In a preferred embodiment, a splitter/combiner performs the functions of both the splitter and the combiner elements.

A circulator may be used to route the input and output signals. The circulator has an input port optically coupled to receive the polarization controller output signal, a recirculation port optically coupled to transmit the polarization controller output signal to the differential polarization delay unit and to receive the delay unit output, and an output port optically coupled to transmit the delay unit output.

An optical tap coupler may be coupled to the output port of the circulator to provide a signal analyzer with a sample of the output signal. The analyzer evaluates the quality of the delay line output signal and provides control signals to the polarization controller and the differential polarization delay unit.

Different components of the present invention may be integrated into an integrated optical device, such as a $LiNbO_3$ chip, which contains birefringent waveguides. In one embodiment, the polarization controller and the differential polarization delay unit are integrated onto a single $LiNbO_3$ chip. In another embodiment, the polarization dispersion compensator components from neighboring channels in a WDM system may be integrated onto a single $LiNbO_3$ chip. Obviously, integrated optical devices based on other materials systems could also be used.

The present invention further relates to a method for compensating for polarization mode dispersion of an incoming optical communications signal. The incoming optical communications signal is first passed through a polarization controller, which aligns the states of the signal polarization to the optical axes of a differential polarization delay unit. In the delay unit, the communications signal is split into a first and second orthogonal principal state of polarization at a split point. The first polarization state is directed to a first waveguide having a first chirped grating having a first reference reflection point. The second polarization state is directed to a second waveguide having a second chirped grating having a second reference reflection point. The first and second reflections of the optical communications signal are recombined at the polarization combiner. The output signal may be sampled using a signal analyzer to determine its quality. The state of polarization of the incoming signal and/or the optical path length location of the reflection points may then be variably adjusted to optimize the quality of the output signal.

In exemplary embodiments, the waveguides of the differential polarization delay unit are birefringent single-mode optical fiber, or birefringent waveguides in an integrated optical device. Birefringent single mode fiber includes polarization maintaining fiber, polarizing fiber, shaped birefringent fiber, and photonic band gap optical fiber.

In a particular embodiment, the fibers are polarization-maintaining (PM) or polarizing (PZ) single mode silica-based optical fibers and the gratings are linearly chirped and have substantially similar length and chirp patterns. In a specific embodiment for compensation of PMD in the range of 100 ps (for up to one bit period at 10 Gb/sec data rate) in a single wavelength channel of a dense wavelength division multiplexed (DWDM) telecommunications system, the first and second gratings measure at least five (5) cm long, with an optical chirp rate that may be set to accommodate the level of chromatic dispersion of the incoming signal. A specific exemplary embodiment for polarization delay of 100 ps includes first and second gratings having a length of 5 cm and a chirp rate of 680 ps/nm for a signal of wavelength 1550 nm.

The optical path length location of one or both of the reference reflection points is adjustably varied to compensate for polarization dispersion between the first and second orthogonal states of polarization. In an alternative embodiment, prior to the step of adjustably varying the optical path length from the second reflection point, the optical path length of at least one of the gratings may be pre-tuned such that one of the reflection points is either at substantially the same optical path length as the other reflection point or slightly ahead or behind (shorter or longer optical path length).

DETAILED DESCRIPTION OF THE INVENTION

Figure 1:
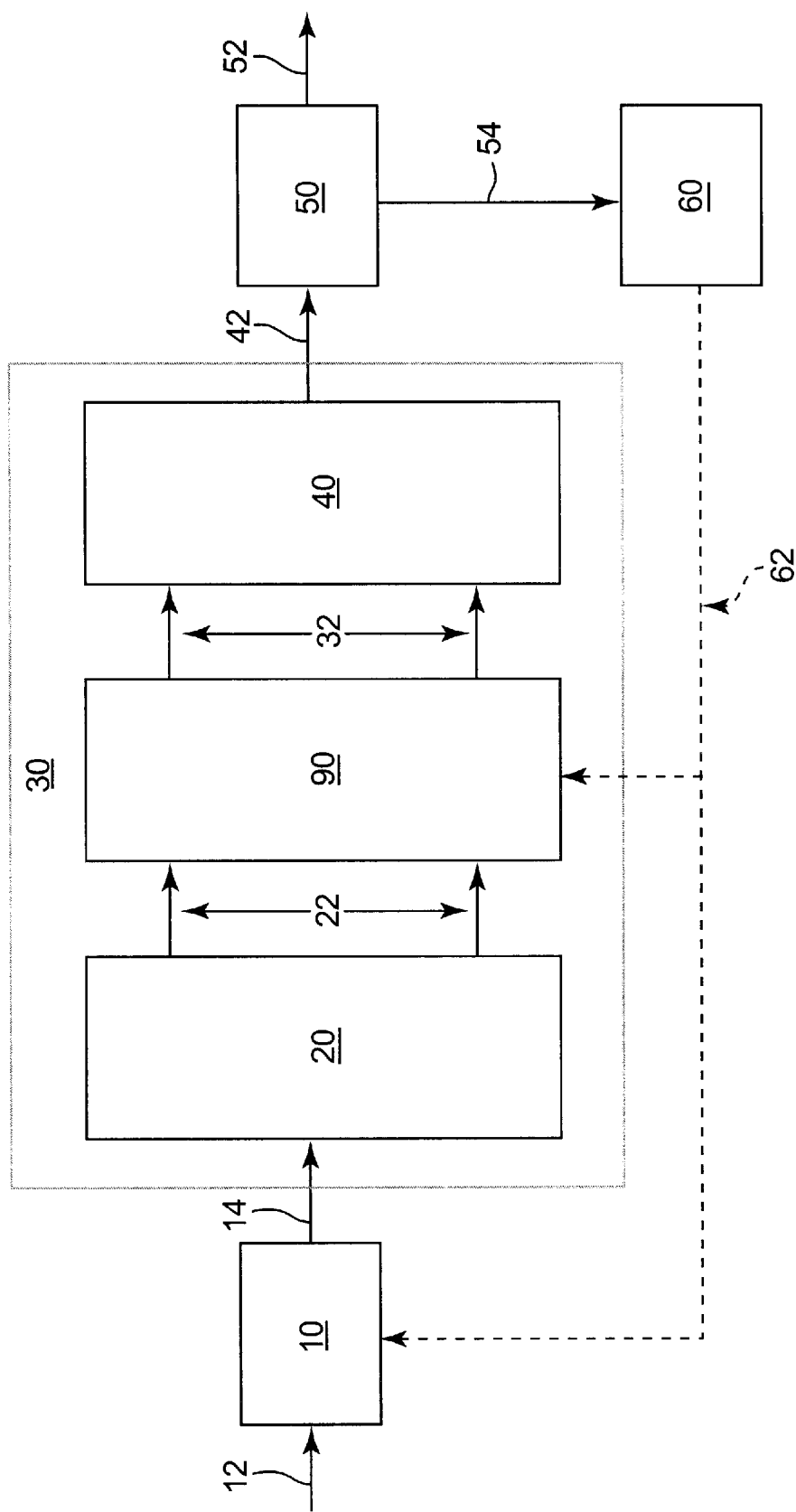
FIG. 1 is a schematic component flow diagram of the polarization mode dispersion compensation method of the present invention.

The present invention is directed to a method for compensation and a system for compensation for polarization mode dispersion (PMD). FIG. 1 illustrates a component flow diagram of a method for compensating for polarization mode dispersion of an incoming optical communications signal 12. A polarization controller 10, that adjusts the state of polarization to minimize the distortion of the signal, receives the incoming signal 12. The output 14 of the polarization controller 10 is optically coupled and aligned to a differential polarization delay unit 30, which includes a polarization splitter 20, a differential delay line 90 and a polarization combiner 40. The polarization splitter 20 receives the output 14 and splits the communication signal into a first and a second orthogonal state of polarization 22. The polarization states 22 are directed into the differential delay line 90 that compensates for PMD by delaying the "fast" component of polarization with respect to the "slow" component of polarization. The delayed signals 32 are coupled to the polarization combiner 40, which recombines the signals into an output signal 42.

The output signal 42 is sampled through a tap coupler 50. The sample signal 54 is coupled to a signal analyzer device 60, while the PMD compensated signal 52 exits the system. The signal analyzer device 60 assesses the quality of the output signal and issues control loop commands 62 to the polarization controller 10 and the differential delay line 90. This affords first order compensation when the incoming signal polarization is properly aligned to the polarization dependent delay device.

Alternately, a second tap coupler (not illustrated) could be placed before the polarization controller 10, to sample incoming signal 12, and via a signal analyzer 60, provide control loop commands 62 to the polarization controller 10 and differential delay line 90.

A PMD compensator of this embodiment may be applied to a WDM system, where a demultiplexer is used to separate the individual channels of the communications system, a separate PMD compensator of the present method is used to compensate for delay in each channel (or group of channels), and a multiplexer is used to recombine the signal.

Figure 2:
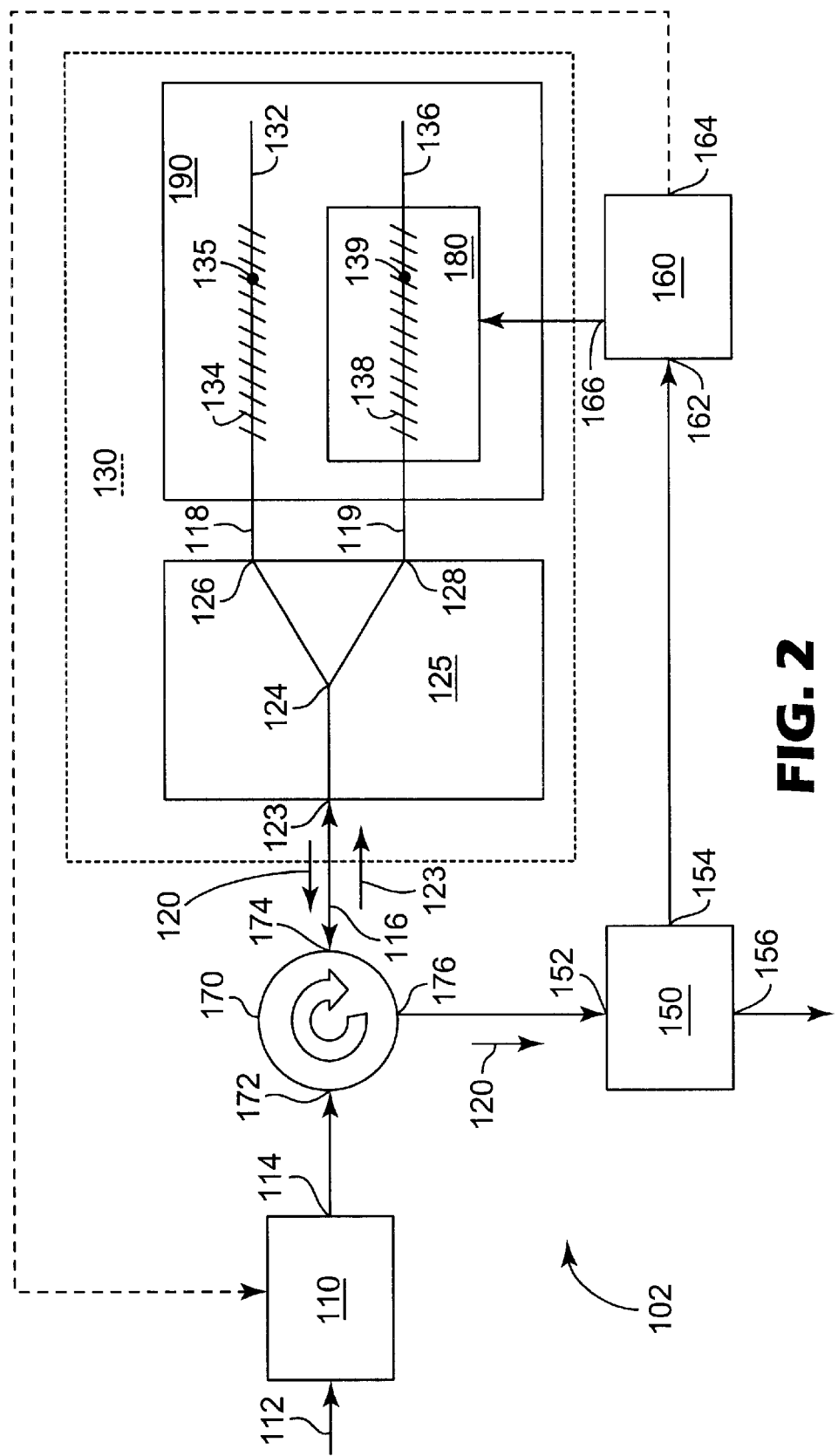
FIG. 2 is a schematic diagram of a dynamically tuned polarization mode dispersion compensator in accordance with the present invention.

FIG. 2 is a schematic diagram of a polarization mode dispersion compensation system 102 in accordance with the present invention. The system 102 includes a polarization controller 110, a circulator 170, a differential polarization delay unit 130, a tap coupler 150 and a signal analyzer 160.

The polarization controller 110 includes an input port 111 that receives the incoming communication signal 112 and output port 113 that outputs an output signal with its states of polarization properly oriented.

The circulator 170 includes an input port 172 that is coupled to the output 114 of the polarization controller, a circulator port 174 that is optically coupled to the differential polarization delay unit 130, and an output port 176 that is coupled to an input port 152 of the tap coupler 150. The circulator 170 receives the signal 114 and couples it as signal 116 to the differential polarization delay unit 130.

The differential polarization delay unit 130 includes a port 123, a polarization splitter/combiner 125, and a differential delay line 190. The splitter/combiner 125 performs the functions of the polarization splitter 20 and the polarization combiner 40 illustrated in FIG. 1. The function of the polarization beam splitter/combiner 125 may be performed by a joint splitter/combiner as shown, or alternatively by a separate splitter and a combiner using circulators or Faraday rotators with a 2×2 polarization splitter arrangement. The polarization beam splitter/combiner 125 has an optical polarization split point 124, and a first and a second port, 126 and 128, respectively. The signal 116 enters through the port 123. At the split point 124, the input signal 116 is split into two orthogonal polarization signals 118 and 119 each polarization signal being directed to one of the ports 126 and 128.

Differential delay line 190 includes a first optical waveguide 132 having a first chirped Bragg grating 134 and a second optical waveguide 136 including a second chirped Bragg grating 138. Both the first and the second waveguides 132 and 136 are birefringent to prevent coupling between the polarization modes. The birefringent waveguides may be birefringent fibers or birefringent integrated optical waveguides. Exemplary birefringent fiber includes polarization maintaining fiber, polarizing fiber, and shaped birefringent fiber. The first and second waveguides 132 and 136 are connected to the first and second ports of the polarization beam splitter/combiner 126 and 128, respectively. In one particular embodiment gratings 134 and 138 are long-length gratings having a length of 15 cm and a chirp rate of 1360 ps/nm.

Both the first grating 134 and the second grating 138 include a reflection reference point, schematically illustrated as 135 and 139, respectively, which represents the effective distance into the gratings 134 and 138 which the optical signals travel before being reflected. In reality, the signal is reflected over some finite length of each grating, but will experience a delay related to the reflection reference points. This reference point is determined during fabrication of the gratings 134 and 138. The optical path length in each leg, and the corresponding time delay, is determined by the reflection reference points 135 and 139, as well as the length of the waveguides 132 and 136 leading to the gratings 134 and 138 from the split point 124.

When the differential polarization delay line 190 is manufactured, the relative delay between the reflections from the two gratings may be adjusted to zero, or biased to a non-zero value. A non-zero bias may be introduced either by fabricating non-identical gratings that have different reflection reference points, or by adjusting the length of the waveguides 132 and 136 between the split point 124 and the gratings 134 and 138. This bias may be used to compensate for the average differential group delay (DGD) expected in the deployed link.

In the present embodiment, the gratings 134 and 138 are substantially identical in reflectivity and chirp rate, to avoid polarization dependent losses and residual chromatic dispersion. The reflection points 135 and 139 of the first and second gratings are configured so as to have a predetermined optical path length difference. The chirp in the grating allows the reflection point of the signal within the grating to be changed when the grating is tuned. The optical position of the reflection reference point of at least one of the gratings may be tuned using a tuning mechanism 180. Embodiments of the tuning mechanism 180 include mechanical (e.g. via piezoelectric or solenoid actuators) thermal, electro-optic, acousto-optic, magnetostrictive, controlled bending of the grating(s) (i.e. gluing to a plate which is bent). and other suitable embodiments known in the art.

A further advantage of the present invention is afforded by considering the case where the differential delay line gratings 134 and 138 and polarization beam splitter/combiner 125 are fabricated in the same birefringent waveguides. Specifically, for a differential polarization delay unit fabricated in birefringent fiber, the polarization splitter 125 could be fabricated by side fusion of the two pieces of PM fiber that make up the waveguides 132 and 136. Gratings 134 and 138 could then be simultaneously written into the two waveguides 132 and 136. Such a process would ensure that the gratings 134 and 138 had similar chirp rates and similar path length with respect to the split point 124. It may be possible with such an arrangement to completely avoid pre-tuning the paths lengths, thereby greatly reducing the cost and complexity of connecting the polarization beam splitter/combiner output ports 126 and 128 to the differential delay line first and second optical waveguides 132 and 136, respectively. Furthermore, such an arrangement may allow shorter gratings (less than 4–5 cm) to be used by eliminating the need to bias the differential delay line 190 initially by tuning one or both of the gratings 134 and 138. Alternatively, fabrication of the PM fiber-based polarization beam splitter/combiner could be performed by the same fusion method after the gratings 134 and 138 have been written in waveguides 132 and 136. This would be facilitated by using shaped PM fiber, such as V-shaped PM fiber, to allow passive alignment of the PM fibers while maintaining the proper orientation of their birefringent axes.

The polarization signals 118 and 119 enter the differential delay line 90 and are each reflected by gratings 134 and 138, respectively. The differential delay line 190 delays the two signals with respect to the other as desired. The reflected signals are recombined at the splitter/combiner 125 into an output signal 120.

The circulator port receives the recombined signal 120, which is directed out of the circulator 170, through the output port 176. The input port 152 of the tap coupler 150 is connected to the output port 176 of the circulator 170. The tap coupler 150 redirects a sample of the optical signal 120 from the tap output port 154 to the input port 162 of the signal analyzer 160. The signal 120 passes through the tap coupler 150 and out the system 102 through the tap coupler output port 156.

The signal analyzer 160 takes the output of the tap coupler 150, through input port 162 and uses it to determine the quality of the communications signal. Using this information, the signal analyzer 160 provides control signals 164 and 166, which are used to adjust the polarization controller 110 and the differential polarization delay unit 130 to minimize output signal distortion. Since the amount of PMD in the system may change continuously, the settings of the polarization controller 110 and the differential polarization delay unit 130 may be continuously changed using the control signals 164 and 166 from the signal analyzer. The signals to the polarization controller 110 and the differential polarization delay unit 130 are changed either by dithering or directionally changing the signals at a speed that is significantly faster than the required compensation speed. As these quantities are changed, the signal analyzer 160 monitors the signal from the tap coupler 150 to indicate the amount of residual PMD in the signal. This quantity may be related to the degree of polarization of the signal or to various frequency components of the detected signal. If the control signals are dithered, the signal analyzer forces their levels to a point where the dithering produces no or minimal change in the monitored signal, typically through integration, indicating a minimization of the DGD in the system. If the control signals are changed directionally, software decides in which direction the control signal levels are to change until the signal distortion due to PMD is minimized. Generally, this method is less preferred since such a scheme requires a computer or microprocessor.

In contrast with previous PMD compensation devices using traditional gratings, embodiments of the present invention may alleviate the difficulty of device biasing by using long (e.g., greater than 4–5 cm) and continuous gratings 134 and 138. Using long gratings allows the communication signal to experience reflection far from the ends of the gratings, reducing distortion upon reflection. Additionally, long continuous gratings avoid stitching errors that may result from a non-continuously written longer grating. In an exemplary embodiment, the reference reflection point of the signal would fall generally along the middle portion of the grating initially. At least 1 cm of grating on each side of this center point would be desirable for the signal to move under operation for a PMD compensation range of 100 ps. In addition, at least another 1 cm of grating on each side of the center point is desirable to account for differences in the delay line optical path lengths, defined as the waveguide length from the split point 124 to the reference reflection points 135 and 139, caused by fusion splice position errors or from differing initial lengths of fiber waveguides 132 and 136. Thus, in an embodiment of the present invention, an exemplary grating for a 1550 nm wavelength signal having a PMD compensation range of 100 ps measures 5 cm.

Another advantage of using long gratings is that almost any desired chirp pattern may be applied to the gratings. Using a linearly chirped Bragg grating results in a fixed amount of chromatic dispersion, which is set by the amount of chirp within the grating. Therefore, the present invention could be used simultaneously as both a fixed chromatic and a variable polarization mode dispersion compensation device. For example, the chirp of the gratings 134 and 138 may be chosen such that the gratings compensate for any chromatic dispersion that has accumulated on the incoming communications signal 112. Such large chirp gratings (700–1400 ps/nm or approx. 7–14 pm/mm) will have a very wide signal reflection band. That is, for a 1360 ps/nm grating, an incoming 10 Gb/s signal will effectively be reflected over approximately 1.2 cm of grating length. This distance increases to 4.8 cm at 40 Gb/s. In the exemplary embodiment of a 680 ps/nm grating and 10 Gb/s operation, for ease of manufacturing purposes, the gratings may be written 50 cm in length such that one part may be applied to eight neighboring wavelength channels in a 100 GHz WDM system and there will be adequate distance to account for pre-tuning and operation at either 10 or 40 Gb/s.

Another advantage of the present invention is obtained through the use of two linearly chirped gratings. For a differential delay line made using a single non-linearly chirped grating, a much higher strain is required to tune the grating compared to the present approach. In the non-linearly chirped grating, the delay generation comes from the birefringence in the fiber creating reflection point differences of the two polarizations at different locations in the fiber. However, because the birefringence of polarization maintaining fiber is very low (~1e-3), the separation between the reflection points may be small. Additionally, the change in separation of the reference reflection points with applied tuning is small. For comparison, using mechanical tuning, the amount of stretch required for the dual grating approach of the current invention would depend on the chirp rate of the grating, but in all cases would be small. In an exemplary embodiment, with a chirp rate of 1000 ps/nm, a wavelength of 1550 nm, and a required delay generation of 100 ps, the amount of stretch can be calculated using the following equation:

$$\Delta P/P(\%) = \Delta\lambda/\lambda * 100 \quad (3)$$

where $\Delta P/P$ is the required strain, $\Delta\lambda$ is the required change in wavelength from the original reference reflection point to the desired reference reflection point, and $\lambda$ is the free-space wavelength. Using this equation, a strain on the fiber of only 0.0064% would be required. Under these same conditions, a non-linear chirped grating in a PM fiber, with a chirp rate that varied from 500 ps/nm to 1500 ps/nm, would produce a delay of only 0.1 ps, instead of the 100 ps obtained with the dual grating approach of the current invention, due to the low birefringence difference. Therefore, the amount of strain required to compensate for PMD using a non-linearly chirped grating in PM fiber may be prohibitive.

Figure 3:
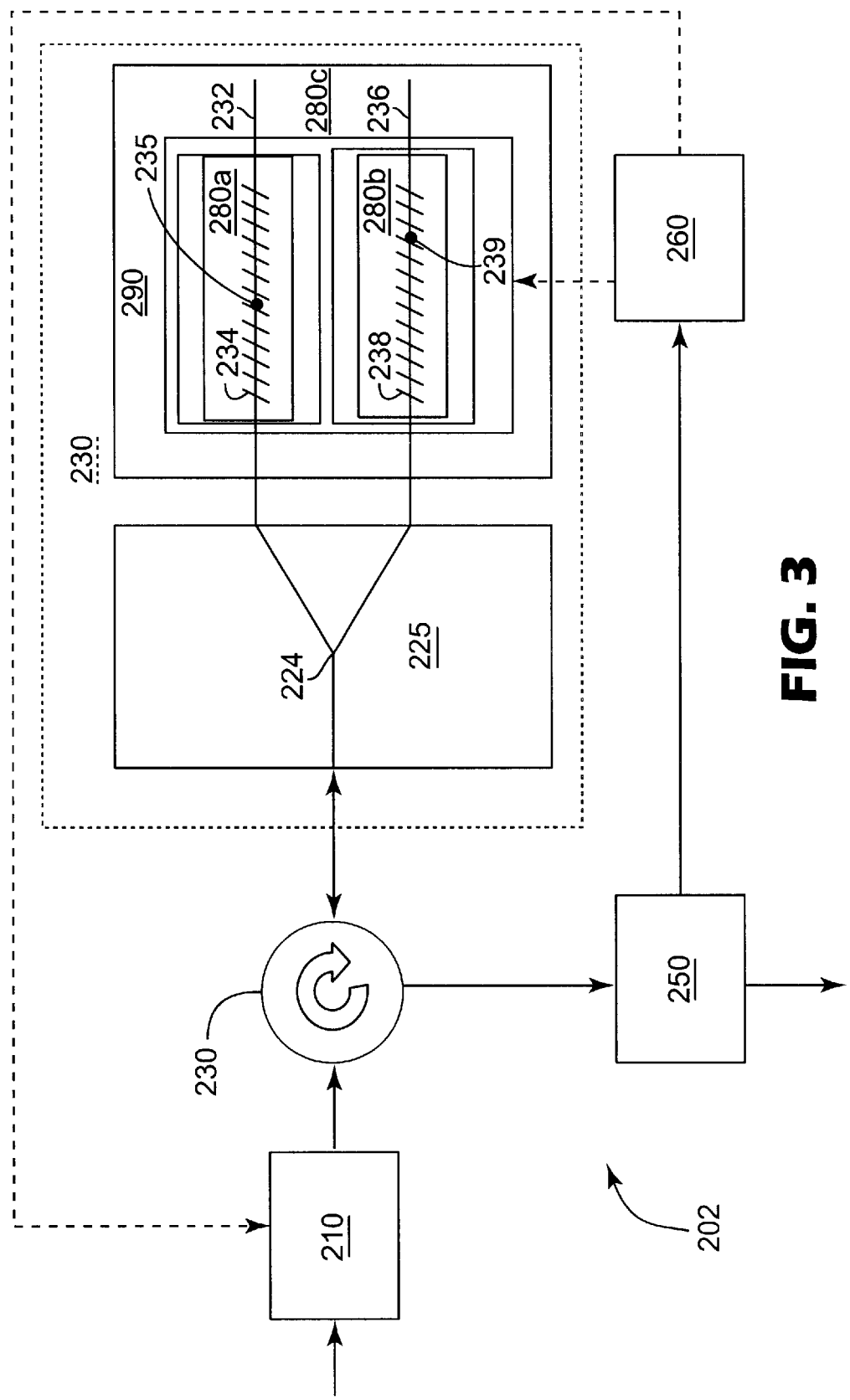
FIG. 3 is a schematic diagram of a dynamically tuned polarization mode dispersion compensator showing three types of tuning in accordance with the present invention.

FIG. 3 is a schematic of a second embodiment of a dynamically tuned PMD compensator 202. The compensator 202 includes a polarization controller 210, a recirculator 270, a differential delay unit 230, a tap coupler 250 and a signal analyzer 260. The differential delay unit 230 includes a polarization splitter combiner 225 and a differential delay line 290. The differential delay line 290 includes a first birefringent waveguide 232 having a first reflection grating 234 having a first reflection reference point 235. The first grating 234 is mounted on a tunable mechanism 280a. The differential delay line also includes a second birefringent waveguide 236 having a second reflection grating 238 having a second reflection reference point 239. The second grating 238 is mounted on a tunable mechanism 280b, which can tune the optical position of the second reflection reference point with respect to split point 224. In turn, both gratings 234 and 238 may be simultaneously tuned by a third tuning mechanism 280c. Both the first grating 234 and the second grating 238 are long-length, chirped gratings (>4–5 cm.).

As shown in FIG. 3, in the exemplary long-length fiber grating embodiment of the present invention, an initial optical path length difference in the two waveguides 232 and 236 may be compensated for by initially biasing the first grating 234, such as by stretching the grating. This biasing does not need to be dynamic. If grating 234 is designed such that the channel wavelength is reflected at the center, under stretch the reflection point will initially change. Thus, the grating needs to be long enough to account for this biasing. An additional 1 cm of grating on each side of center reference reflection point 235 may be incorporated to account for biasing, thus resulting in a grating at least 5 cm in length. Alternately, both of the gratings 234 and 238 may be tuned dynamically. For example, the first grating 234 could be statically tuned with tuning mechanism 280a to account for the initial balancing of the OPL of the two waveguides 232 and 236, as described earlier. The second grating 238 may be dynamically tuned with tuning mechanism 280b to compensate for the differential group delay, and both gratings 234 and 238 could be tuned simultaneously by a common tuning mechanism 280c, such as temperature tuning. This could alleviate any temperature effects and assure that both gratings 234 and 238 are operating well within their operating range. To avoid polarization fading effects, the gratings 234 and 238, shown in FIG. 3, are both written in a polarization preserving or polarizing fiber. This is an advantage over the previous art because it eliminates the need for two additional polarization controllers that would be required in a differential polarization delay unit to correct for mode coupling in the single-mode fiber gratings. The issue of mode coupling becomes more apparent when using long gratings (>4–5 cm), where stresses that may induce mode coupling need to be avoided. Such long length gratings benefit from a method to assure that the polarization is indeed preserved throughout.

Exemplary Embodiments:

Exemplary chirp rates may be either 680 ps/nm or 1360 ps/nm as these correspond to 40 km or 80 km DCM chirp rates (for standard SMF-28 fiber).

1. Exemplary minimum length grating (single channel PMD compensator) at 10 Gb/s with 680 ps/nm chirp.
   Length=2*(length for 100 ps delay)+2*(length for pre-tuning)+2*(length for signal reflection assuming signal bandwidth is 0.1 nm)
   Length=2*(1 cm)+2*(1 cm)+2*(0.54 cm)
   Length=5.08 cm=>5.0 cm
   Factors of 2 are used to signify a '+ or –' situation.

2. Exemplary long-length grating (eight channel compensator) at either 10 or 40 Gb/s with 680 ps/nm chirp.
   Length=7*(channel bandwidth converted to length via chirp)+2*(length for pre-tuning)+2*(length for 100 ps delay)+2*(length for signal reflection for 40 Gb/s)
   Length=7*(5.7 nm*680 ps/nm*1 cm/100 ps)+2*(1 cm)+2*(1 cm)+2*(2.176 cm)
   Length=47.11 cm=>50 cm 3. Exemplary calculation for higher-order case (dual grating section+single nonlinear chirped FBG for variable chromatic and 2nd order PMD compensation)
   Assume + or – 500 ps/nm tunability on the variable chromatic dispersion section.
   Assume 80 km of fiber (1360 ps/nm of fixed chromatic dispersion for which to compensate).
   Know that for the nonlinear chirped FBG all dispersion values must be positive (cannot have a zero crossing for it to operate correctly).
   Pick a chirp range from 200 ps/nm up to 1200 ps/nm (this will give the + or – 500 ps/nm about an average value of 700 ps/nm).
   Fixed PMD compensator must compensate for remaining chromatic dispersion which is 1360 ps/nm–700 ps/nm=660 ps/nm.

Figure 4:
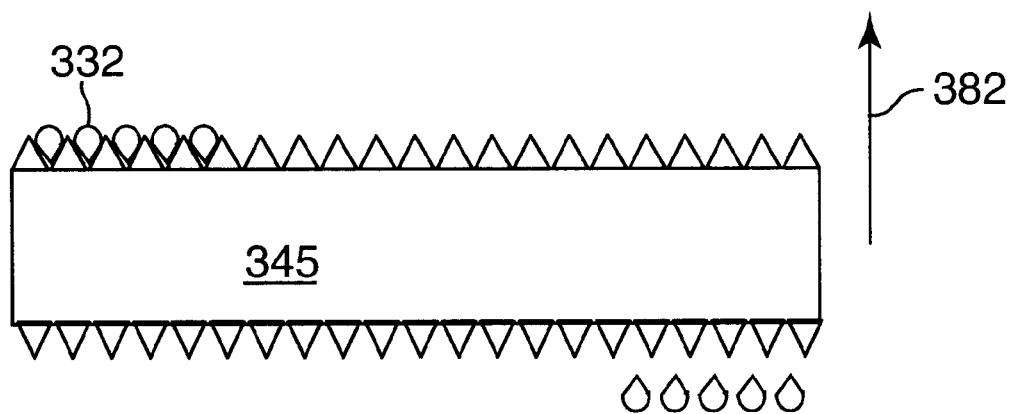
FIG. 4 is a cut-away drawing of a delay line waveguide made with shaped PM fiber in accordance with the present invention.
Figure 4:
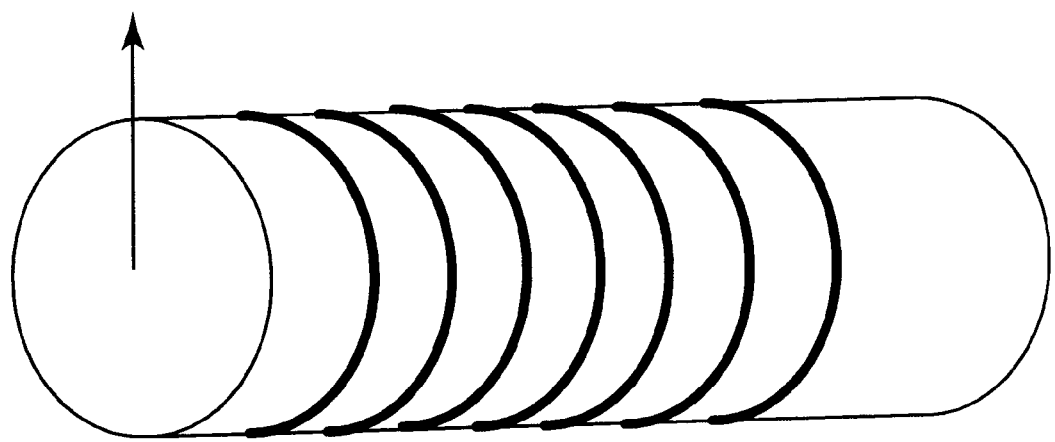

In one particular embodiment, shown in FIG. 4, a V-shaped polarization maintaining fiber waveguide 332 with a long grating 334 is wrapped around a grooved piezoelectric mandrel 345. Epoxy may be used to secure the entire mechanism. For this embodiment, the stress 382 applied during tuning is always in the same direction and along one of the major axes of the polarization-preserving fiber, such that minimal mode coupling occurs. Such a tuning technique will also alleviate the problems of stretching a long grating in a limited amount of space equally along its distance.

Figure 5:
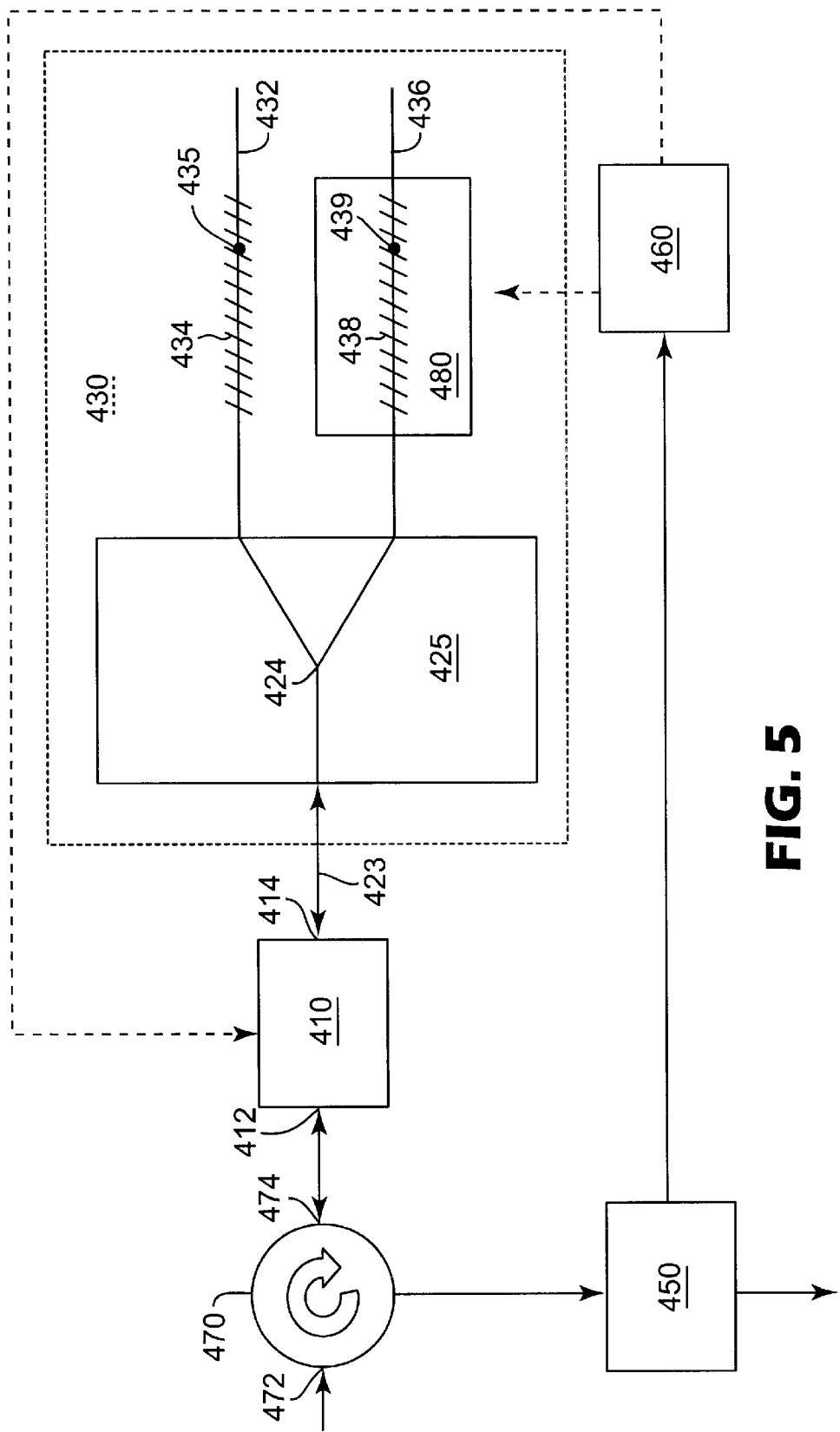
FIG. 5 is a schematic diagram of a dynamically tuned polarization mode dispersion compensator where the system circulator is placed before the system polarization controller.

An alternative embodiment of the present invention is shown in FIG. 5. Similar elements to those in FIG. 3 share the same last two reference numerals. In this case the circulator 470 is placed before the polarization controller 410. The circulator input port 472 would receive the incoming communications signal. The circulator output port 474 is coupled to the polarization controller input port 411. The polarization controller output port 413 is then coupled to the input port 423 of the differential polarization delay unit 430.

Figure 6:
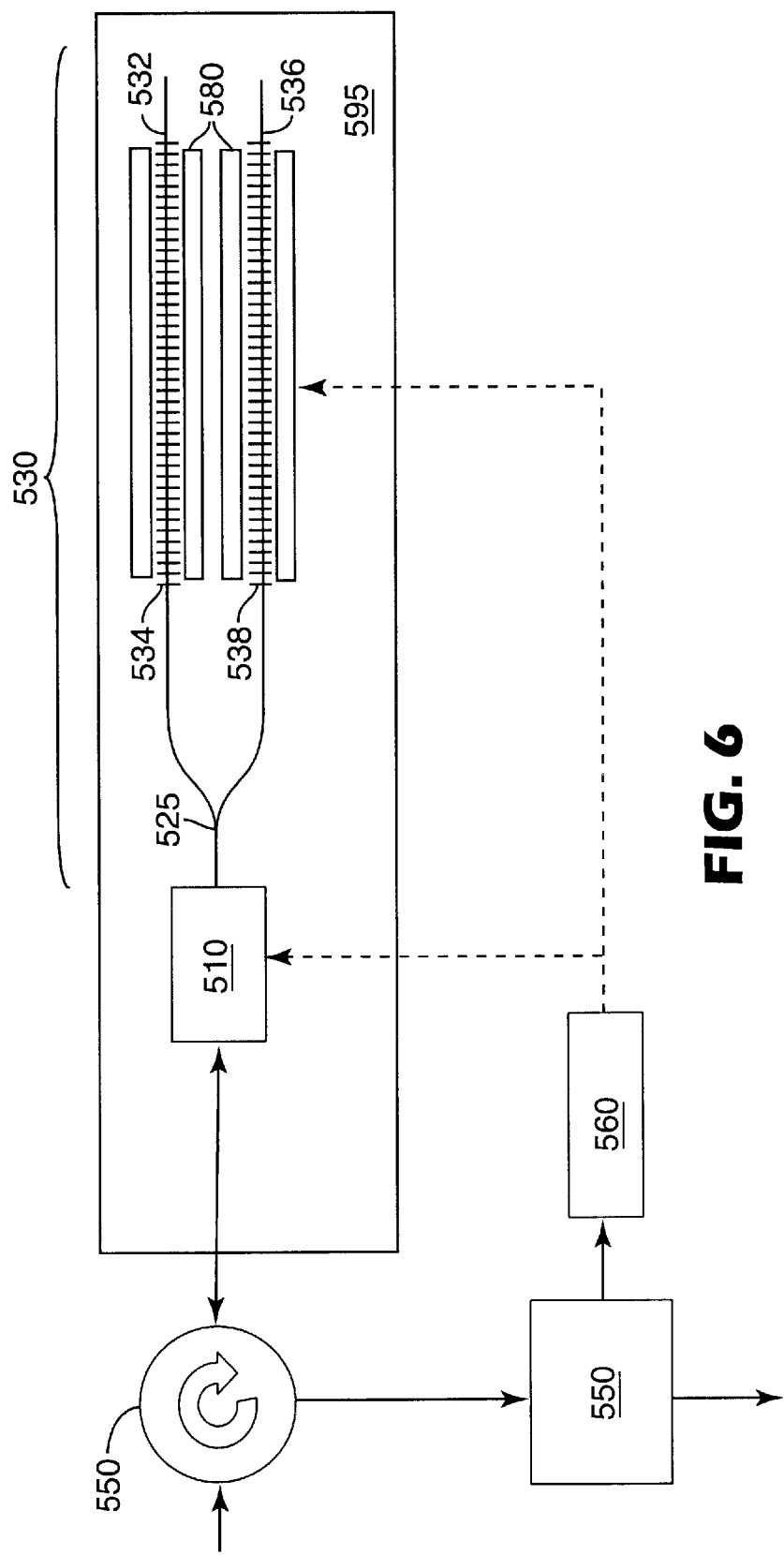
FIG. 6 is a schematic diagram of an adaptive polarization compensator partly integrated onto a LiNbO$_3$ chip in accordance with the present invention.
Figure 7:
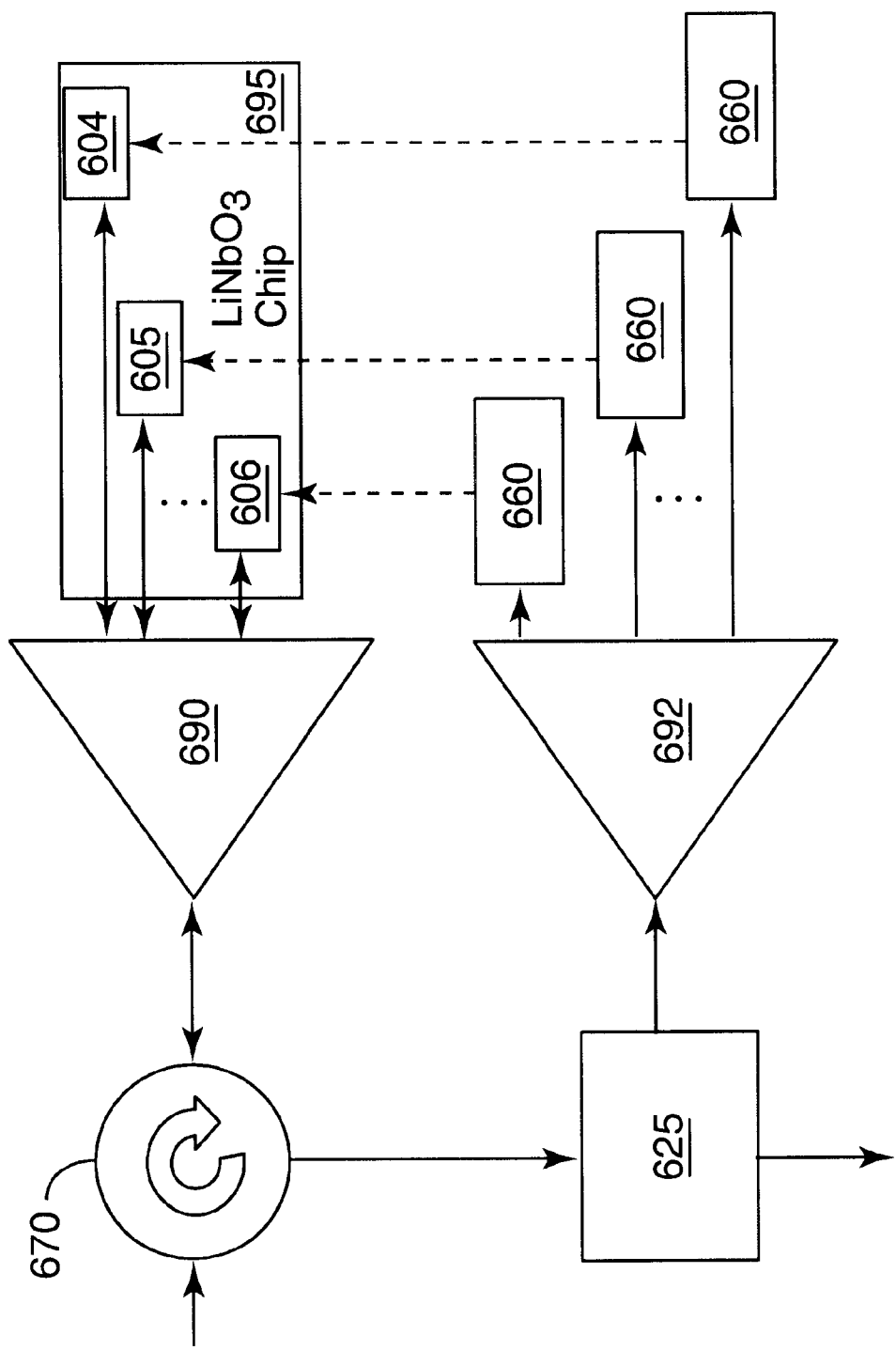
FIG. 7 is a schematic diagram of an integrated multi-channel PMD compensator for a WDM system.
Figure 8:
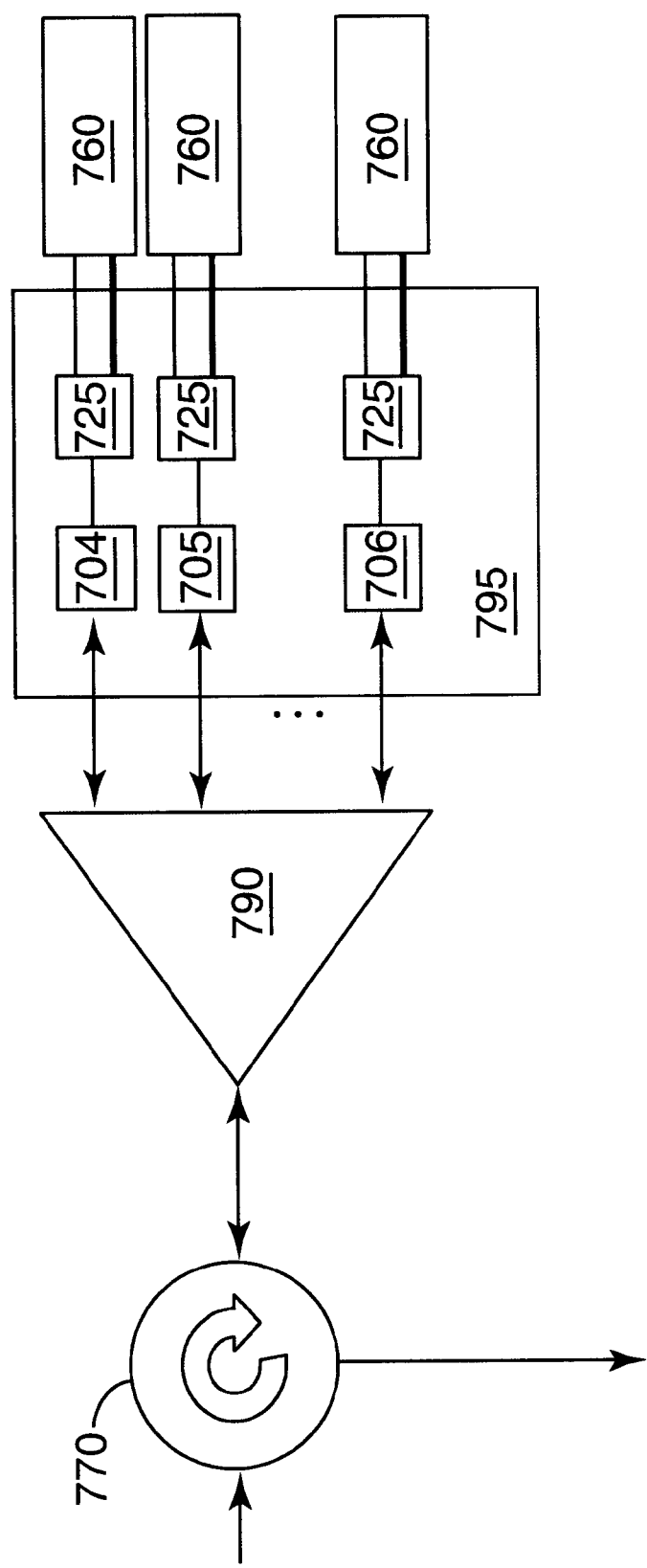
FIG. 8 is a schematic diagram showing the case where a tap coupler is integrated onto the LiNbO$_3$ chip for each channel in a WDM system.

FIGS. 6–8 illustrate alternative embodiments of the present invention where the compensator of the present invention, or portions thereof, is integrated onto a lithium niobate, or other suitable birefringent electro-optical material, chip. Again, similar elements to those in FIG. 3 share the same last two reference numerals.

To allow for polarization splitting, and to achieve a high electro-optic effect for the tuning of waveguide gratings, the orientation of the lithium niobate crystal is x-cut, y-propagating. Polarization controllers may be fabricated in this crystal orientation as well. Preliminary calculations estimate that only ~50 V may be required for the tuning of gratings, depending on the design. Since the fastest time changes for this device are expected to be on the order of 100's of microseconds, significantly higher voltages may be acceptable, allowing for further design flexibility. There are a number of possibilities for making the gratings, such as etching, ion implantation, diffusion doping, or using a high-refractivity index layer patterned on the wafer surface.

In one particular embodiment of the present invention, shown in FIG. 6, a polarization controller 510 and a differential polarization delay unit 530 are integrated into a $LiNbO_3$, or other suitable birefringent electro-optical material, chip 595. Previous methods for polarization mode dispersion compensation utilizing Lithium Niobate used 'single-path' techniques, where both polarizations of the signal travel the same path and the differential delay comes from the birefringence of the crystal. However, only ~25 psec maximum differential delay may be possible in a single pass of a 4" wafer. Additionally, large minimum bend radii (~3 cm) make multiple pass configurations difficult. The design of the present invention greatly enhances the possible amount of differential delay from an integrated Lithium Niobate waveguide. For example, to create a differential delay of 300 psec (using a push-pull configuration where both gratings are tuned in the opposite direction) a linearly chirped grating length on the order of only 3 cm would be required. The current embodiment has a further advantage. Because the polarization splitter 525 and the differential delay line waveguides 532 and 536 are fabricated on the lithium niobate together, no waveguide OPL biasing is required for the purpose of accommodating splicing tolerances. However, bias may be purposefully introduced to build in a fixed DGD offset value.

Furthermore, a PMD compensator of this embodiment can be applied to a WDM system, where a demultiplexer is used to separate the individual channels of the system, a separate compensation system is used for each channel, and a multiplexer is used to recombine the signal.

FIG. 7 shows an alternate embodiment to further reduce the number of components in a WDM system utilizing PMD compensation for each wavelength channel. In this embodiment, PMD compensators 604–606 from neighboring WDM channels are integrated onto one Lithium Niobate chip 695. Each individual compensator is based on the embodiment shown in FIG. 6. The signals from the compensators 604–606 are multiplexed (demultiplexer) by a WDM MUX/DEMUX 690. A plurality of signal analyzers 660 coupled to a WDM demultiplexer 692 monitor the output and help control each compensator 604–605. Such a scheme allows the use of only one circulator 670 and one tap coupler 625. Furthermore, only one optical packaging step may be required for all the channels integrated onto the chip, reducing the overall cost of packaging.

FIG. 8 shows an alternate embodiment of the multi-channel WDM design shown in FIG. 7. In this embodiment, tap couplers 725 for each wavelength channel are integrated along with the PMD compensator components 704, 705, 706 (illustrated detail in FIG. 6) onto the Lithium Niobate (LiNbO$_3$) chip 795. The tap coupler may be integrated in the reflected path, either before or after the polarization controller, such that the optical packaging may be performed in one step. Doing this would further integrate the functions of the PMD compensator and greatly reduce overall cost.

Figure 9:
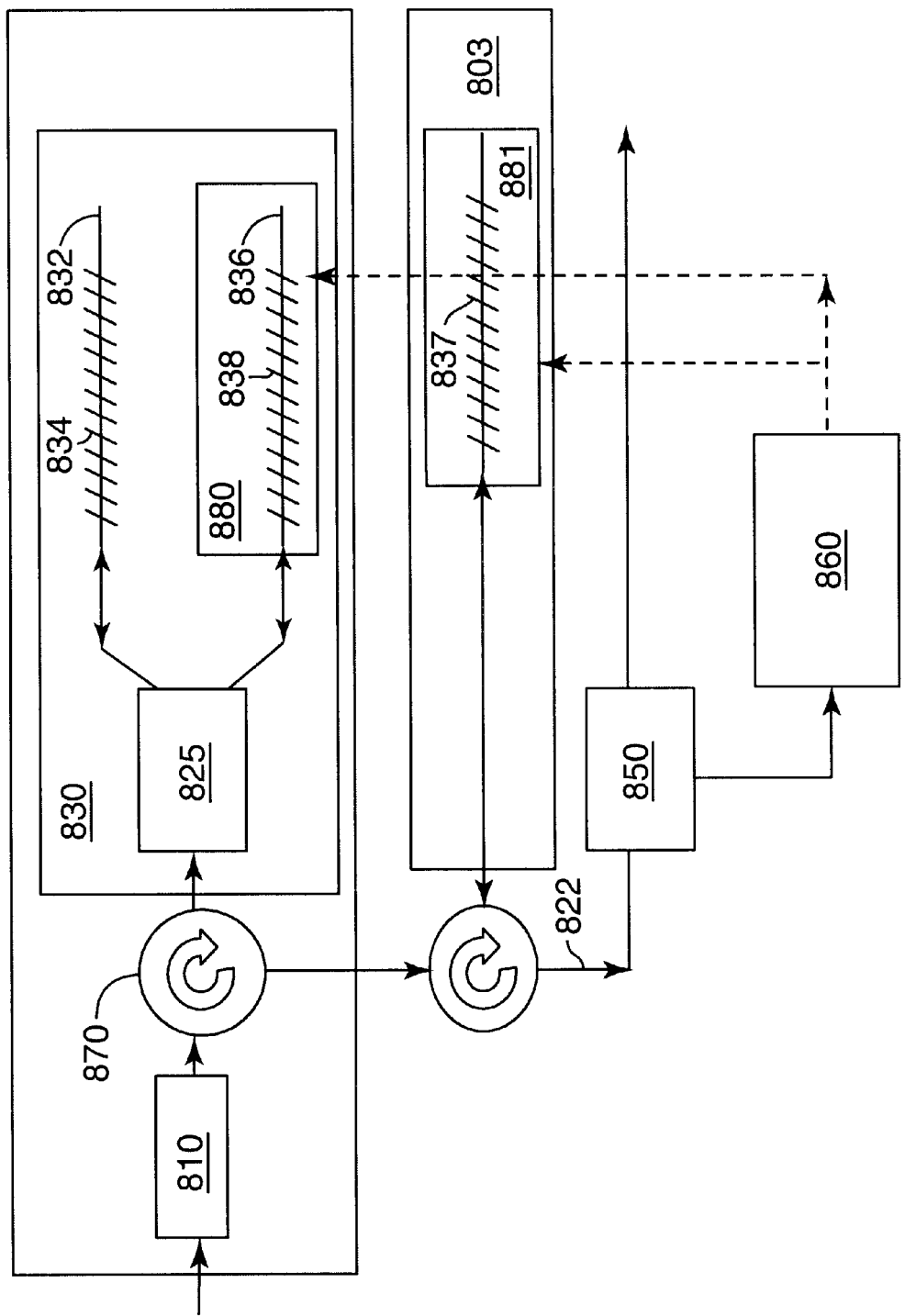
FIG. 9 is a schematic diagram for a higher order PMD compensation and variable chromatic dispersion compensation system where the dual grating $1^{st}$ order PMD compensator is followed by a tuned non-linearly chirped grating.

FIG. 9 shows an advanced embodiment for compensating first and higher orders of dispersion, both chromatic and polarization mode. Similar elements to those in FIG. 2 share the same last two reference numerals. The second order PMD term is quantitatively equivalent to the term for varying chromatic dispersion. This technique is therefore attractive because many of the new 40 Gb/s systems to be deployed will require tunable chromatic dispersion compensation as well as PMD compensation due to reduced dispersion tolerance, and due to the presence of add/drop and switching nodes which will cause link lengths to vary considerably as a function of time. In FIG. 9, the communications signal 812 is first sent through a polarization controller 810, a circulator 870, and a differential polarization delay unit 830, which also acts as a fixed chromatic dispersion compensator when the appropriate chirp in the gratings is chosen. Then, before sampling the output to determine the signal quality, the signal is sent through a variable chromatic/$2^{nd}$ order PMD compensator 803, which includes a standard non-linearly chirped grating 837 that can be tuned to adjust the level of chirp. The output signal from the variable chromatic/$2^{nd}$ order PMD compensator 803 is then sampled by tap coupler 850 and sent back out into the system. Signal analyzer 860 is used to analyze the quality of the sampled output signal. In an exemplary embodiment, with a standard link length chromatic dispersion component (1360 ps/nm) and with +/−500 ps/nm of tunability, a dual gratings differential delay line 830 with a chirp rate of 660 ps/nm and a non-linearly chirped grating in the variable chromatic/$2^{nd}$ order PMD compensator 803 with a chirp rate that varies from 200 ps/nm to 1200 ps/nm would compensated for higher-order dispersion.

Referring to FIGS. 1 and 2, a method for compensating for polarization mode dispersion of an incoming optical communications signal according to the present invention includes the step of adjusting the state of polarization of the incoming optical communications signal 12 to a state that minimizes the distortion of the signal after it has passed through the differential polarization delay unit. The adjusted communications signal 14 is split into a first and second orthogonal principal states of polarization 22 at the split point 124. For some splitter devices, the split point may be an optical abstraction that indicates the optical path position where the polarization mode split occurs, rather than necessarily a physical split point. The first of the polarization states is directed to the first birefringent waveguide 132 having the first chirped grating 134 having the first reference reflection point 135. The second of the polarization states is directed to the second birefringent waveguide 136 having the second chirped grating 138 having a chirp pattern substantially similar to that of the first chirped grating and having the second reference reflection point 139.

The optical path length from the second reflection point 139 to the split point 124 may be variably adjusted to compensate for polarization dispersion between the first and second orthogonal states of polarization. The polarization modes are reflected by the Bragg gratings 134 and 138 back towards the split point 124. The polarizing beam splitter/combiner 125 recombines the first and second polarization states into output signal 42.

Those skilled in the art will appreciate that the present invention may be used in a variety of applications where correction of polarization mode dispersion is present. Alternatively, it may even be used to introduce polarization mode dispersion in a controlled manner. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An adaptive polarization mode dispersion compensator comprising
   a. a polarization controller that converts incoming light of an arbitrary polarization to a controller output signal having a desired state of polarization;
   b. a differential polarization delay unit optically coupled to receive the controller output signal from the polarization controller, the differential polarization delay unit including:
      i. a polarization beam splitter element having a first input port coupled to receive the controller output signal, a split point, a first and a second output port, where at the split point the controller output signal is split into a first and a second orthogonal polarization signal, the first and the second polarization signal being directed to the first and second output ports respectively;
      ii. a first birefringent optical waveguide optically coupled and aligned to the first output port, the first optical waveguide having a first chirped grating to reflect the first polarization signal and having a first reference reflection point;
      iii. a second birefringent optical waveguide optically coupled and aligned to the second output port, the second optical waveguide having a second chirped grating to reflect the second polarization signal and having a second reference reflection point;
      iv. at least one tuning mechanism coupled to at least one of the gratings, wherein the tuning mechanism variably adjusts one of the reference reflection points with respect to the other reference reflection point;
      v. a combiner element that recombines the two reflected orthogonal polarization signals into a delay line output;
   c. a signal quality analyzer optically coupled to sample the differential polarization delay unit output, wherein the analyzer evaluates the quality of the differential polarization delay unit output signal and provides a control signal to the polarization controller and the differential polarization delay unit.

2. The polarization mode dispersion compensator of claim 1, wherein the optical waveguides are birefringent single mode optical fibers.

3. The polarization mode dispersion compensator of claim 1, wherein the optical waveguides are channel waveguides in an integrated optical waveguide circuit.

4. The polarization mode dispersion compensator of claim 1, wherein the optical waveguides are channel waveguides in a lithium niobate integrated optical chip.

5. The polarization mode dispersion compensator of claim 2, wherein the birefringent optical fibers are polarization-maintaining fibers.

6. The polarization mode dispersion compensator of claim 2, wherein the birefringent optical fibers are shaped fibers.

7. The polarization mode dispersion compensation of claim 2, wherein the birefringent optical fibers are photonic bandgap optical fibers.

8. The polarization mode dispersion compensator of claim 2, wherein the birefringent optical fibers are polarizing fibers.

9. The polarization mode dispersion compensator of claim 1, wherein a splitter/combiner element acts both as the splitter element and the combiner element.

10. The polarization mode dispersion compensator of claim 1, wherein the first and the second gratings are linearly chirped gratings.

11. The polarization mode dispersion compensator of claim 1, wherein the first grating and the second grating both have substantially a same reflection profile and substantially the same chirp rate; and the first and second reference reflection points are at substantially a same optical path length with respect to the split point.

12. The polarization mode dispersion compensator of claim 1, where previous to adjustment by the tuning mechanism, the first reflection point of the first grating is at a shorter optical path length from the split point than the second reflection point.

13. The polarization mode dispersion compensator of claim 1, where the polarization controller and the differential polarization delay unit are both integrated into a same LiNbO$_3$ chip.

14. The polarization mode dispersion compensator of claim 1, where the first and second grating are long-length, continuous gratings.

15. The polarization mode dispersion compensator of claim 1, wherein the tuning mechanism comprises a. a first tuning device coupled to both the first and second grating, where the first tuning device tunes both gratings an equal amount, and b. a second tuning device, where the second tuning device independently tunes only one of the gratings.

16. The polarization mode dispersion compensator of claim 2, the tuning mechanism comprising mechanisms that stretch the fiber gratings.

17. The polarization mode dispersion compensator of claim 1, further comprising a circulator, the circulator having an input port optically coupled to receive the controller output signal, a recirculation port optically coupled to transmit the controller output signal to the differential polarization delay unit and to receive the delay line output, and an output port optically coupled to transmit the delay line output.

18. The polarization dispersion compensator of claim 17, wherein the signal quality analyzer is coupled to the output port of the circulator.

19. The polarization dispersion compensator of claim 17, wherein the signal quality analyzer is comprised of an optical tap coupler and an optical analysis section.

20. The polarization dispersion compensator of claim 17, wherein the signal quality analyzer is comprised of an optical tap coupler, an optical receiver, and an electrical analysis section.

21. A differential polarization delay unit comprising:

a. a polarization beam splitter/combiner having a split point, an input port and, a first and a second output port, where at the split point an input signal coupled into the input port is split into two orthogonal polarizations, each polarization being directed to one of the output ports;

b. a first birefringent waveguide, the first waveguide being optically coupled and aligned to the first output port of the polarization beam splitter/combiner, the first waveguide having a first chirped grating having a first reference reflection point;

c. a second birefringent waveguide, the second waveguide being optically coupled and aligned to the second output port, the second waveguide having a second chirped grating having a second reference reflection point, the second grating having a chirp pattern that is substantially the same as that of the first grating; and d. at least one tuning mechanism coupled to at least one of the gratings, wherein the tuning mechanism variably adjusts the optical path length of at least one of the reference points with respect to the split point.

22. The differential polarization delay unit of claim 21, wherein the first and second reference points are at substantially the same optical path length with respect to the split point.

23. The differential polarization delay unit of claim 21, wherein one of the references has a shorter optical path length from the split point, the difference in optical path length being related to an expected polarization mode dispersion.

24. The differential polarization delay unit of claim 21, wherein the first and second birefringent waveguides are polarization-maintaining fibers.

25. The differential polarization delay unit of claim 21, wherein the first and second birefringent waveguides are polarizing fibers.

26. The differential polarization delay unit of claim 21, wherein the first and second birefringent waveguides are channel waveguides in an integrated optical device.

27. The differential polarization delay unit of claim 21, wherein the first and second grating measure at least 5 cm.

28. The differential polarization delay unit of claim 21, wherein the chirped gratings are linearly chirped.

29. The differential polarization delay unit of claim 21, further comprising a second tuning mechanism coupled to both chirped gratings, wherein the second tuning mechanism variably adjusts the chirp rate of both the first and second grating.

30. The differential polarization delay unit of claim 21, where both the polarization beam splitter/combiner and the differential delay line are integrated into a LiNbO$_3$ chip.

* * * * *

UNITED STATES PATENT AND TRADEMARK OFFICE
CERTIFICATE OF CORRECTION

PATENT NO. : 6,748,126 B2 Page 1 of 1
DATED : June 8, 2004
INVENTOR(S) : Koch, Barry J.

It is certified that error appears in the above-identified patent and that said Letters Patent is hereby corrected as shown below:

Title page,
Item [56], References Cited, U.S. PATENT DOCUMENTS, please add the following reference:
-- 6,208,776 B1  3/2001  Prohaska et al. --
FOREIGN PATENT DOCUMENTS, please add the following reference:
-- DE  197 17 457 A1  10/1998
 EP  1 087 245 A2  3/2001 --
OTHER PUBLICATIONS, please add the following reference:
-- Z. PAN, et al; "Chip-Free Tunable PMD Compensation Using Hi-Bi Nonlinearly-Chirped FBGs in a Dual-Pass Configuration", *OFC Technical Digest, Postconference Ed, Baltimore, MD* (March 7-10, 2000); New York; Vol. 3 of 4; pp. ThH2-1/113--ThH2-3/115 --

Signed and Sealed this

Fourth Day of January, 2005

JON W. DUDAS
*Director of the United States Patent and Trademark Office*